INVENTOR
ROBERT M. ENGLUND
BY Kenneth T Grace
ATTORNEY

United States Patent Office 3,553,659

Patented Jan. 5, 1971

3,553,659

BIEMITTER TRANSISTOR SEARCH MEMORY ARRAY

Robert M. Englund, Golden Valley, Minn., assignor to Sperry Rand Corporation, New York, N.Y., a corporation of Delaware Filed Dec. 11, 1968, Ser. No. 782,842
Int. Cl. G11c *11/40;* G06f *3/00*
U.S. Cl. 340—173 1 Claim

ABSTRACT OF THE DISCLOSURE

A Search memory utilizing two cross-coupled biemitter transistors as the storage elements storing the true and the complement of each bit of the multibit designator words held in the Search memory. The storage elements are arranged at the intersections of orthogonal sets of parallel bit line pairs and sets of parallel word-sense lines with the two emitters of each transistor coupled to the intersecting bit and word-sense lines, respectively. Interrogation of the designator words is along the bit lines producing match/mismatch output signals along the word-sense lines.

BACKGROUND OF THE INVENTION

The present invention relates to the electronic data processing art and in particular to the Search memory portion of an associative memory system—see the W. W. Davis Pat. No. 3,387,274 for a general discussion of such a system. In a Search memory the bits of the designator words that comprise the stored information are compared to the like-ordered bits of the search word held in a search register with the results of such comparison being sensed along the word-sense line. Search memories may store the true and the complement of the designator word bits, with the state of the search word bit, either a "1" or a "0," determining whether the true or the complement designator word bit is to be tested for comparison to provide a match/mismatch output singal. Various search criteria, e.g., locate all designator words that are; equal to the search word, greater than the search word, less than the search word, or between two search words, etc., may be utilized as determined by the electronic data processing system requirements.

Storage requirements for storing the bits of the multibit designated words may take many forms including magnetizable elements and semiconductor devices. Detectors for evaluating the output signals, likewise, are of many forms including magnetizable elements and semiconductor devices. The present invention is directed toward the use and arrangement of semiconductor devices as the Search memory storage elements for storing the true and the complement of the bits of the designator words whereby the need for additional output signal amplifiers is eliminated, the storage elements providing sufficient amplification to drive the associated detectors.

SUMMARY OF THE INVENTION

The present invention is directed toward the use and arrangement of two cross-coupled bi-emitter transistors as the storage elements of the bits of the multibit designator words that are stored in the Search memory portion of an associative memory system. The two transistors of each storage element, designated the true transistor and the complement transistor, are, alternatively, set into the conducting (ON) and the nonconducting (OFF) modes representative of the storing of a logical "1" and a logical "0"; e.g., for the storing of a "1" the true transistor is set into a "1" state and the complement transistor is set into a "0" state while for the storing of a "0" the true transistor is set into a "0" state and the complement transistor is set into a "1" state. The logical sense, i.e., either a "1" or a "0," of the bit of the search word determines whether the true transistor or the complement transistor is selectively alternatively tested with the output signal sensed along the word-sense line.

The storage elements of the present invention are arranged in a matrix array of rows of parallel word-sense lines and orthogonal columns of parallel bit line pairs. Each search word bit held in the search register drives two parallel bit lines, described as the true bit line and the compliment bit line, which two bit lines are coupled to the true transistor and to the complement transistor, respectively, of all like-ordered bits of all the designator words of the Search memory. Likewise, all bits of each designator word are coupled by a single word-sense line to a detector which evaluates the associated output signals and provides, as an output, signals representative of the match/mismatch condition of the associated designator word.

DESCRIPTION OF THE PREFERRED EMBODIMENT

Figure 1:
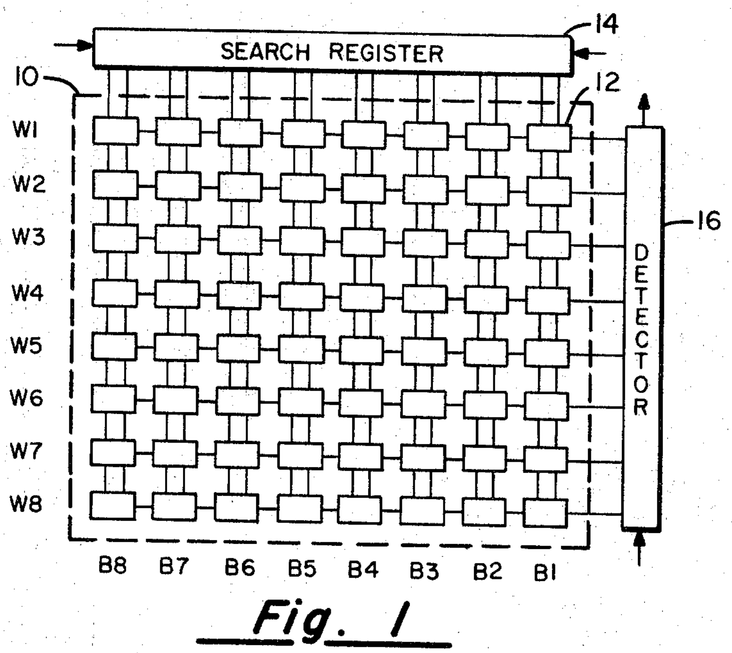
FIG. 1 is a block diagram of a Search memory system incorporating the present invention.

With particular reference to FIG. 1 there is disclosed a Search memory array 10 incorporating the present invention. Array 10 has an illustrated capacity of eight designator words W1–W8 each of 8 bits in length B8–B1, with the highest ordered bit being the left-most bit, B8. and the lowest ordered bit being the right-most bit B1. The storage elements 12 of array 10 are arranged in a matrix array of rows of parallel word-sense lines along which all the bits of each designator word are aligned and orthogonal columns of parallel bit line pairs along which all the like-ordered bits of all the designator words are aligned. Search register 14 holds the search word, each bit of which is coupled to an associated pair of bit lines for coupling the like-ordered bits of all the designator words of array 10. That is, the highest ordered bit, B8, of the search word held in search register 14 is coupled to the highest ordered bits, B8, of designator words W1–W8. Each search word bit of search register 14 drives two parallel bit lines, described as the true bit line and the complement bit line, which two bit lines are coupled to the true and the complement storage elements, respectively, of each storage element 12. In contrast, all storage elements 12 of each multibit designator word are coupled to an associated word-sense line which word-sense lines are coupled to a detector 16 which evaluates the associated output signals and provides, as an output, signals representative of the comparison of the search word to the associated designator words.

Each storage element 12 includes two cross-coupled bi-emitter transistors as the storage elements of the bits of multi-bit designator words W1–W8. The two transistors, designated the true transistor Q1 and the complement transistor Q2 of each storage element 12 are alternatively set into the conducting and the nonconducting modes representative of the storing of a logical "1" and a logical "0", e.g., for the storing of a "1" the true transistor is set into a "1" or ON condition and the complement transistor is set into a "0" or OFF condition while for the storing of a "0" the true transistor is set into a "0" or OFF condition and the complement transistor is set into a "1" or ON condition. The logical sense, i.e., either a "1" or a "0," of each bit of the search word held in search register 14 determines whether the true transistor Q1 or the complement transistor Q2 of the associated like-ordered storage elements 12 are tested with the associated output signals sensed along the word-sense lines.

A typical search operation utilizing the Search memory system of FIG. 1 consists of the comparison of the bits of the search word held in search register 14 to the like-ordered bits of the designator words held in array 10 providing, at the output of the word-sense lines associated with designator words W1–W8, output current signals that are representative of those designator words that satisfy the search criteria established by the Search memory system. Array 10 output signals are, in turn, coupled to a detector 16 which receives such signals and provides output signals that are indicative of the results of the comparison of the designator words W1–W8 to the search word. One possible search function would be bit-parallel, i.e., all bits B8–B1 of the 8-bit search word that is held in search register 14 are compared simultaneously to each like-ordered bit of the 8-bit designator words W1–W8 of array 10. However, the to-be-described search function is bit-serial, starting with the highest ordered bit, B8, progressing serially through all the bits of the search word to the lowest ordered bit, B1. The match/mismatch signals developed in the associated word-sense lines, are comprised of significant or insignificant current signals, the conformations of which are determined by the match or mismatch condition of each bit of the search word held in search register 14 and the corresponding bit in each designator word held in array 10.

CIRCUIT DESCRIPTION

Figure 2:
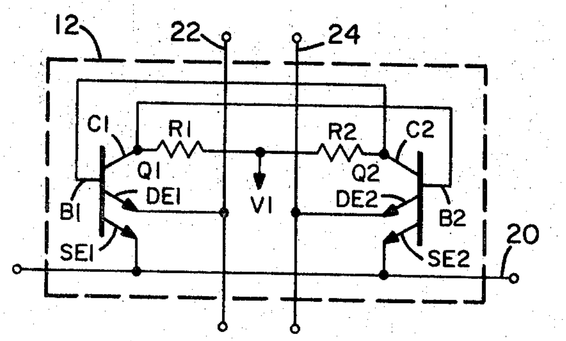
FIG. 2 is a circuit schematic of the storage elements of FIG. 1.

With particular reference to FIG. 2 there is presented an illustration of a circuit schematic of the storage element 12 of FIG. 1. Storage element 12 essentially consists of two cross-coupled bi-emitter transistors Q1 and Q2 designated the true and the complement transistors, respectively. The cross-coupling of the two transistor's base-collector electrodes (the base electrode B2 of complement transistor Q2 is coupled to the collector electrode C1 of the true transistor Q1 while the base electrode B1 of the true transistor Q1 is coupled to the collector electrode C2 of the complement transistor Q2) provides an arrangement whereby the two transistors Q1, Q2 are alternatively ON, OFF or OFF, ON, respectively, as in conventional cross-coupled transistor operation. Additionally, each sense-emitter electrode SE1, SE2 of transistors Q1, Q2 is coupled to a common word-sense line 20 which passes through storage element 12, a plurality of serially intercoupled ones of which form a word-sense line for defining all the bits of a multi-bit designator word, e.g., bits B8–B1 of designator word W1 of FIG. 1. In contrast, the data-emitter electrodes DE1, D2 of transistors Q1, Q2, respectively, are coupled to the respectively associated true bit line 22 and complement bit line 24, respectively. The true bit line, complement bit line pair of each storage element 12 is serially intercoupled to other true bit line, complement bit line pairs of other like-ordered storage elements 12 of the multibit designator words of array 10 of FIG. 1, e.g., like-ordered bits B8 of designator words W1–W8 of array 10.

Figure 3A:
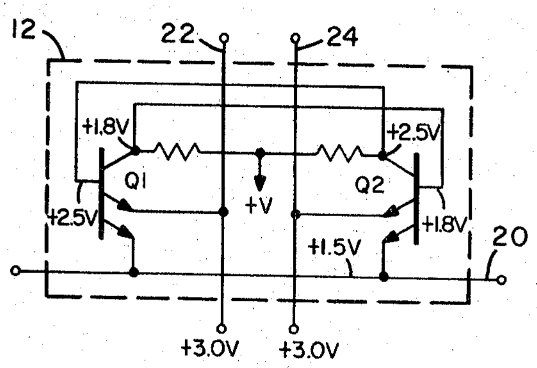
FIGS. 3*a*, 3*b* are illustrations of the voltage conditions of the storage element of FIG. 2 for the noted stored conditions.
Figure 3B:
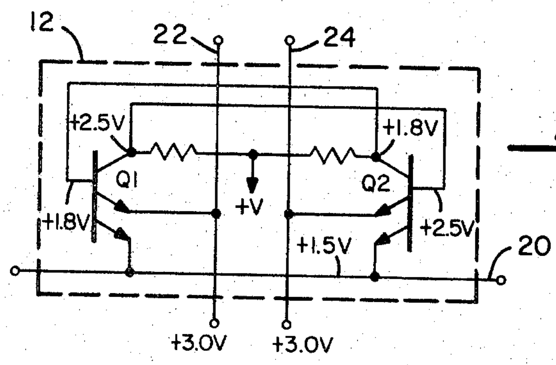

With particular reference to FIGS. 3*a*, 3*b* there are presented illustrations of the voltage conditions of storage element 12 for the stored "1" and stored "0," conditions respectively. With a +3.0 volt signal coupled to both the true bit line 22 and the complement bit line 24, as by the associated search word bit stage of search register 14:

for a stored "1" condition of FIG. 3*a*;
Q1 is ON storing a "1,"
Q2 is OFF storing a "0"

for a stored "0" condition of FIG. 3*b*;
Q1 is OFF storing a "0,"
Q2 is ON storing a "1."

For the writing of a "1" or of a "0" in storage element 12 the states of transistors Q1, Q2 are switched from a stored "0," "1" condition, respectively, to a stored "1," "0" condition, respectively, or from a stored "1," "0" condition respectively, to a stored "0," "1" condition, respectively.

For the writing of a "1" from a stored "0" condition of FIG. 3*b*; true bit line 22 is switched from a +3.0 volt signal to a +1.0 volt signal, and complement bit line 24 is held at a +3.0 volt signal. The word-sense line voltage $V_S$ is now raised, by detector 16, to +1.8 volts from its prior +1.5 volts causing the collector electrode C2 of transistor Q2, and, accordingly, the base electrode B1 of transistor Q1, to be moved toward +2.1 volts. Thus, with the data-emitter DE1 of transistor Q1 at 1.0 volts and a $V_{BE}$ of +1.0 volts, transistor Q1 starts to conduct turning transistor Q2 OFF and turning transistor Q1 ON. Now, storage element 12 is storing a "1." If storage element 12 had been initially storing a "1," as in FIG. 3*a*, raising the word-sense line 22 to +1.8 volts and lowering the true bit line 22 to 1.0 volt would have caused current to be transferred from the sense-emitter SE1 transistor Q1 to its data-emitter DE1 and transistor Q1 would have remained ON and transistor Q2 would have remained OFF.

For the writing of a "0" from a stored "1" condition of FIG. 3*a*; complement bit line 24 is switched from a +3.0 volt signal to a +1.0 volt signal, and true bit line 22 is held at a +3.0 volt signal. The word-sense line voltage level $V_S$ is now raised to +1.8 volts, by detector 16, from its prior 1.5 volts causing the collector electrode C1 of transistor Q1, and, accordingly, the base electrode B1 of transistor Q1, to be moved toward +2.1 volts. Thus, with the data-emitter DE2 of transistor Q2 at 1.0 volts and a $V_{BE}$ of +1.0 volts, transistor Q2 starts to conduct turning transistor Q1 OFF and turning transistor Q2 ON. Now storage element 12 is storing a "0." If storage element 12 had been initially storing a "0" as in FIG. 3*b*, raising the word-sense line 20 to +1.8 volts and lowering the complement bit line 24 to 1.0 volt would have caused current to be transferred from the sense-emitter SE2 of transistor Q2 to its data-emitter DE2, and transistor Q2 would have remained ON and transistor Q1 would have remained OFF.

SEARCH-MATCH

Assume that storage element 12 is storing a "1" and that it is to be searched for a "1." Prior to initiating the search operation, transistor Q1 is ON with its sense-emitter SE1 at +1.5 volts and its data-emitter DE1 at +3.0 volts, as in FIG. 3*a*. Accordingly, the primary current path is through sense-emitter SE1. When searching for a "1," a +1.0 volt signal is coupled to the true bit line bringing transistor Q1 data-emitter DE1 to a +1.0 volt level, and, hence, the primary current flow in transistor Q1 switches from sense-emitter SE1 to data-emitter DE1. Accordingly, only a small leakage current signal is caused to flow in word-sense line signifying identity or a match find.

Assume that storage element 12 is storing a "0" and it is to be searched for a "0." Prior to initiating the search operation, transistor Q2 is ON with its sense emitter SE2 at +1.5 volts and its data-emitter DE1 at +3.0 volts, as in FIG. 3*b*. Accordingly, the primary current path is through sense-emitter SE2. When searching for a "0," a +1.0 volt signal is coupled to complement bit line bringing transistor Q2 data-emitter DE2 to +1.0 volt, and, hence, the primary current flow in transistor Q2 switches from sense-emitter SE2 to data-emitter DE2. Accordingly, only a small leakage current signal is caused to flow through word-sense line signifying identity, or a match find.

SEARCH-MISMATCH

Assume that storage element 12 is storing a "1" and that it is to be searched for a "0." Prior to initiating the search operation, transistor Q2 is OFF with its sense-emitter SE2 at +1.5 volts and its data-emitter DE2 at +3.0 volts as in FIG. 3*b*. Accordingly, the primary current path is through sense-emitter SE1. When searching for a "0," a +1.0 voltage signal is coupled to complement bit line causing transistor Q2 data-emitter DE2 to be at +1.0 volts, and, hence, the primary current path is not switched. Accordingly, a large current signal is caused to flow in the word-sense line signifying non-identity or a mismatch find.

Assume that storage element 12 is storing a "0" and that it is to be searched for a "1." Prior to initiating the search function, transistor Q1 is OFF with its sense-emitter SE1 at +1.5 volts and its data-emitter DE1 at +3.0 volts as in FIG. 3*b*. Accordingly, the primary current path is through sense-emitter SE2. When searching for a "1," a +1.0 voltage signal is coupled to true bit line causing transistor Q1 data-emitter DE1 to be at a +1.0 volt level, and, hence, the primary current path is not switched. Accordingly, a large current signal is caused to flow in the word-sense line signifying non-identity or a mismatch find.

SYSTEM OPERATION

With reference back to FIG. 1 assume a search word of 10001011 held in search register 14 and the following designator words held in array 10.

| | |
|---|---|
| W1 | 10010101 |
| W2 | 11000000 |
| W3 | 10001011 |
| W4 | 01101101 |
| W5 | 01010111 |
| W6 | 11001100 |
| W7 | 10101011 |
| W8 | 10001010 |

A search operation is initiated by search register 14 bit serially coupling the voltage equivalents, +1.0 volt for a "1" to the true bit line and +1.0 volt for a "0" to the complement bit line, of the bits of the search word held in search register 14, to the associated true and complement bit line pairs of array 10 whereby, as discussed above, with particular reference to FIGS. 3*a* 3*b* match or mismatch current signals would be induced in the associated word-sense line. With the designator word conformations of above only designator word W3 would couple no mismatch output current signals to detector 16 indicating the match find condition for such word.

Thus, it is apparent that there has been described and illustrated herein a preferred embodiment of the present invention that provides an improved search memory utilizing two cross-coupled biemitter transistors as the storage elements storing the true and the complement of each bit of multibit designator words held in the search memory.

I claim:

1. A search memory array, comprising:

a plurality of storage elements, each including two similar biemitter transistors, each having a base electrode, a collector electrode, a data-emitter electrode and a sense-emitter electrode, said transistors designated the true transistor and the complement transistor, said transistors cross-coupled with the base electrode of the true transistor coupled to the collector electrode of the complement transistor and with the base electrode of the complement transistor coupled to the electrode of the true transistor;

the sense-emitter electrodes of the true and complement transistors common coupled;

said storage elements arranged in a matrix array of rows and columns, the storage elements of each row serially aligned along their common coupled sense-emitter electrodes for forming an associated word-sense line, each storage element along the associated word-sense line representative of an ordered bit for forming a multi-bit designator word;

the storage elements of each column serially aligned along the data-emitter electrodes of their true transistors and along the data-emitter electrodes of their complement transistors for forming a true bit line, complement bit line pair;

search register means for holding the true and the complement of the ordered bits of a multibit search word;

means separately coupling the true and the complement of each ordered bit of said search word to the separate true and complement bit lines, respectively, of the like-ordered one of said true bit line, complement bit line pairs;

said search register means selectively alternatively coupling a search signal to the true bit line or the complement bit line of each of said true bit line, complement bit line pairs in accordance with the logical sense of the associated bit of said search word for generating in said word-sense lines match/mismatch signals that are representative of the comparison of said search word to said designator words as determined by said search signals.

References Cited

UNITED STATES PATENTS

| | | | |
|---|---|---|---|
| 3,218,613 | 11/1965 | Gribble et al. | 340—173 |
| 3,423,737 | 1/1969 | Harper | 340—173 |
| 3,427,598 | 2/1969 | Kubinec | 307—238 |
| 3,436,738 | 4/1969 | Martin | 340—173 |
| 3,487,376 | 12/1969 | Hart, Jr. | 307—238 |

PAUL J. HENON, Primary Examiner

H. E. SPRINGBORN, Assistant Examiner

U.S. Cl. X.R.

340—172.5; 307—238, 291, 299

UNITED STATES PATENT OFFICE
CERTIFICATE OF CORRECTION

Patent No. 3,553,659 Dated January 5, 1971

Inventor(s) Robert M. Englund

It is certified that error appears in the above-identified patent and that said Letters Patent are hereby corrected as shown below:

Column 6, line 13, "the electrode" should read -- the collector electrode --; line 30, "multibit" should read -- multi-bit --.

Signed and sealed this 1st day of June 1971.

(SEAL)
Attest:

EDWARD M.FLETCHER,JR.
Attesting Officer

WILLIAM E. SCHUYLER, JR.
Commissioner of Patents

FORM PO-1050 (10-69)

USCOMM-DC 60376-